United States Patent
Ali

(10) Patent No.: US 7,978,474 B2
(45) Date of Patent: Jul. 12, 2011

(54) LIQUID-COOLED PORTABLE COMPUTER

(75) Inventor: Ihab A. Ali, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 150 days.

(21) Appl. No.: 11/805,501

(22) Filed: May 22, 2007

(65) Prior Publication Data

US 2008/0291629 A1    Nov. 27, 2008

(51) Int. Cl.
*H05K 7/20* (2006.01)

(52) U.S. Cl. .................. 361/700; 165/80.4; 165/104.33; 361/699

(58) Field of Classification Search .................. None
See application file for complete search history.

(56) References Cited

U.S. PATENT DOCUMENTS

| | | | | |
|---|---|---|---|---|
| 5,731,954 A | * | 3/1998 | Cheon | 361/699 |
| 6,055,157 A | * | 4/2000 | Bartilson | 361/699 |
| 6,234,240 B1 | * | 5/2001 | Cheon | 165/80.3 |
| 6,741,464 B2 | * | 5/2004 | Kitano et al. | 361/679.53 |
| 6,796,372 B2 | * | 9/2004 | Bear | 165/104.21 |
| 6,999,316 B2 | * | 2/2006 | Hamman | 361/701 |
| 7,218,523 B2 | * | 5/2007 | Hamman | 361/718 |
| 7,342,787 B1 | * | 3/2008 | Bhatia | 361/700 |
| 2004/0070942 A1 | * | 4/2004 | Tomioka et al. | 361/700 |
| 2004/0188069 A1 | * | 9/2004 | Tomioka et al. | 165/104.33 |
| 2005/0052848 A1 | * | 3/2005 | Hamman | 361/701 |
| 2005/0111183 A1 | * | 5/2005 | Pokharna et al. | 361/687 |
| 2005/0178533 A1 | * | 8/2005 | Minamitani et al. | 165/104.33 |
| 2006/0187639 A1 | * | 8/2006 | Carswell | 361/699 |
| 2006/0272803 A1 | * | 12/2006 | Senyk et al. | 165/287 |

* cited by examiner

*Primary Examiner* — Gregory D Thompson
(74) *Attorney, Agent, or Firm* — Park, Vaughan, Fleming & Dowler LLP; Steven E Stupp

(57) ABSTRACT

Embodiments of a computer system are described. This computer system includes a power source that is coupled to a heat pipe, where the power source includes an integrated circuit. This heat pipe may contain a liquid coolant that has a density greater than a first pre-determined value at room temperature. A pump is coupled to the heat pipe is configured to circulate the liquid coolant through the heat pipe. Furthermore, a heat exchanger coupled to the heat pipe is configured to transfer heat from the heat pipe to an environment external to the computer system.

21 Claims, 7 Drawing Sheets

─ 600

```
┌─────────────────────────────────────────────────────────────────────┐
│ CIRCULATE A LIQUID COOLANT IN A HEAT PIPE, WHERE THE LIQUID COOLANT │
│     HAS A DENSITY GREATER THAN A FIRST PRE-DETERMINED VALUE         │
│                              610                                    │
└─────────────────────────────────────────────────────────────────────┘
                                  │
                                  ▼
┌─────────────────────────────────────────────────────────────────────┐
│ TRANSFER HEAT FROM THE HEAT PIPE TO AN ENVIRONMENT EXTERNAL TO      │
│ THE PORTABLE COMPUTER SYSTEM USING A HEAT EXCHANGER, WHERE THE      │
│ HEAT IS GENERATED BY AN INTEGRATED CIRCUIT IN A PORTABLE COMPUTER   │
│                              SYSTEM                                 │
│                              612                                    │
└─────────────────────────────────────────────────────────────────────┘
```

FIG. 6

LIQUID-COOLED PORTABLE COMPUTER

BACKGROUND

1. Field of the Invention

The present invention relates to heat-transfer techniques. More specifically, the present invention relates to the use of liquid coolants to transport heat in computer systems.

2. Related Art

The computational performance of electronic devices has increased significantly in recent years. This increased performance has been accompanied by an increase in power consumption and associated heat generation. Furthermore, this additional heat generation has made it harder to maintain acceptable internal and external operational temperatures in these devices.

Portable devices, such as laptop computers (notebook PCs), cellular telephones, and personal digital assistants have additional design constraints which make it even harder to manage thermal load. In particular, size and weight limitations in such devices can make it difficult to achieve desired operational temperatures. For example, in many portable devices the size and weight of metal heat sinks may be prohibitive. Furthermore, battery life constraints in such devices may limit the available power for active cooling mechanisms, such as fans.

Hence what is needed are cooling mechanisms that overcome the problems listed above.

SUMMARY

One embodiment of the present invention provides a computer system that includes a power source that is coupled to a heat pipe, where the power source includes an integrated circuit. This heat pipe may contain a liquid coolant that has a density greater than a first pre-determined value at room temperature. A pump is coupled to the heat pipe is configured to circulate the liquid coolant through the heat pipe. Furthermore, a heat exchanger coupled to the heat pipe is configured to transfer heat from the heat pipe to an environment external to the computer system.

In some embodiments, the integrated circuit includes a processor.

In some embodiments, the liquid coolant includes: water, a coolant in an R133 group of coolants, and/or a coolant in an R134 group of coolants. Furthermore, in some embodiments the liquid coolant includes two phases of matter. For example, the two phases may include a gaseous phase in bubbles, and nucleation of the bubbles may be used to increase the heat-transfer coefficient of the liquid coolant. In another example, latent heat may be used to increase the heat-transfer coefficient of the liquid coolant. And in some embodiments the liquid coolant includes metal particles to increase the heat-transfer coefficient of the liquid coolant.

In some embodiments, the liquid coolant has a thermal conductivity greater than a second pre-determined value.

In some embodiments, the pump includes a mechanical pump and/or an electrostatic pump. Furthermore, in some embodiments the pump is configured to circulate the liquid coolant using mechanical vibration of a membrane.

In some embodiments, the computer system includes a laptop computer.

In some embodiments, the heat exchanger includes a forced-fluid driver and a heat coupling-mechanism coupled to the forced-fluid driver. This forced-fluid driver may be configured to pump heat from inside the computer system to the environment. Furthermore, in some embodiments the heat coupling-mechanism includes convective-cooling fins.

In some embodiments, the computer system includes a cold plate coupled to the power source and the heat pipe. This cold plate includes channels which increase a surface area wetted by the liquid coolant, thereby increasing a heat-transfer coefficient of the cold plate.

Another embodiment provides a method for cooling a portable computer system. During this method, the liquid coolant is circulated in the heat pipe. Then, heat is transferred from the heat pipe to an environment external to the portable computer system using the heat exchanger. Note that the heat is generated by an integrated circuit in the portable computer system.

BRIEF DESCRIPTION OF THE FIGURES

FIG. 6 is a flow chart illustrating the process of cooling a portable computer system in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a cooling mechanism, a computer system (such as a desktop computer and/or a laptop or portable computer) that includes the cooling mechanism, and a method for cooling a computer system are described. Note that the computer system may include stationary and/or portable electronic devices, such as cellular telephones, personal digital assistants, game consoles, and MP3 players. This cooling mechanism may include a heat pipe that includes a liquid coolant and a pump that is configured to circulate the liquid coolant in the heat pipe (for example, in a liquid flow channel). Note that the liquid coolant may have: a density greater than 100 kg/m$^3$ at room temperature; a thermal conductivity greater than 0.1 W/mK at room temperature; and/or little or no shear strength. Moreover, the cooling mechanism may be coupled to a power source (such as one or more integrated circuits) and may be configured to transfer heat from the integrated circuit to another location, either internal or external to the computer system. In some embodiments, a heat exchanger, coupled to the heat pipe, facilitates this heat transfer.

In some embodiments, the liquid coolant includes two phases of matter (such as a liquid phase and a gaseous phase). For example, the liquid coolant may include bubbles that include a gas. Therefore, in some embodiments nucleation of the bubbles and/or latent heat may be used to increase the heat-transfer coefficient of the liquid coolant. Furthermore, in some embodiments the liquid coolant includes metal particles to increase the heat-transfer coefficient of the liquid coolant.

Figure 1A:
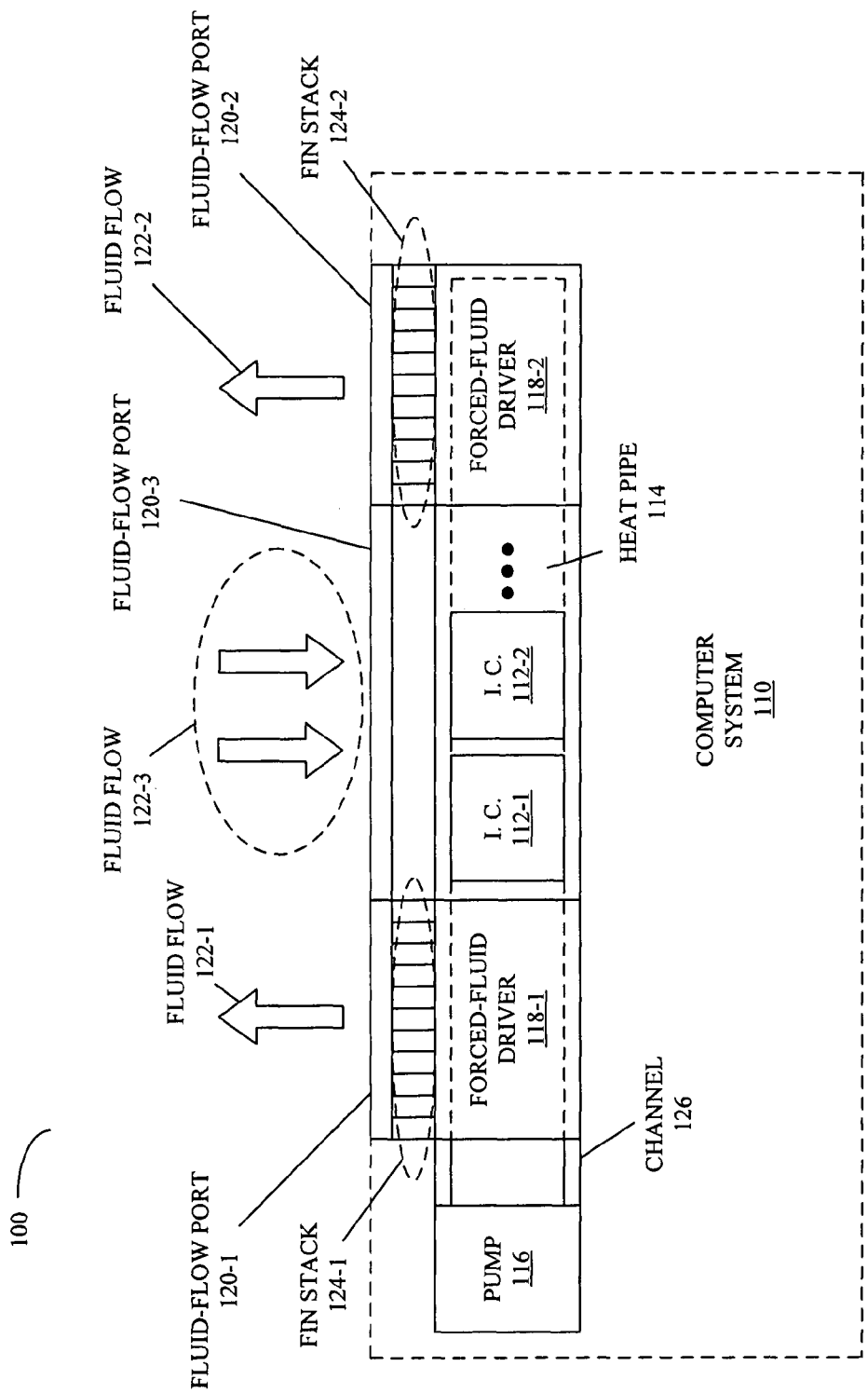
FIG. 1A is a block diagram illustrating a computer system in accordance with an embodiment of the present invention.
Figure 1B:
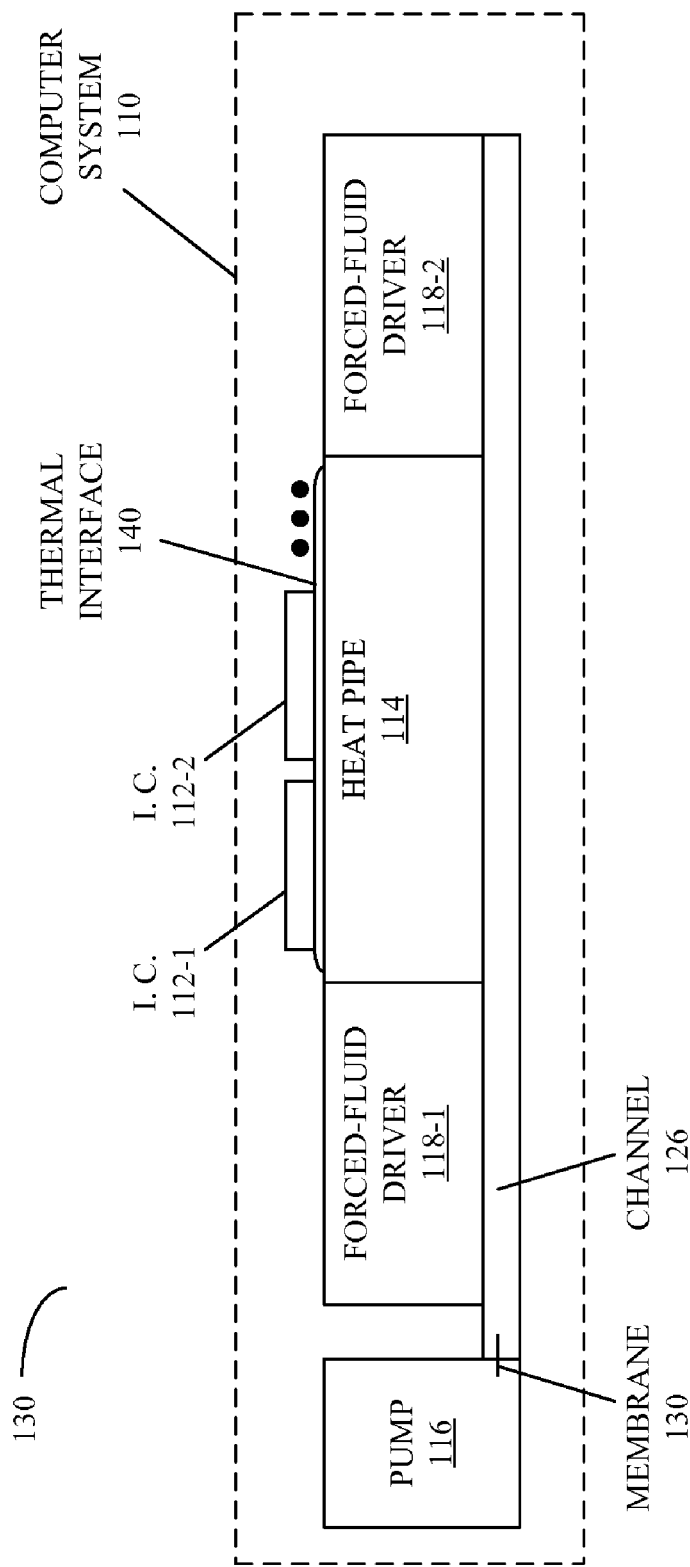
FIG. 1B is a block diagram illustrating a computer system in accordance with an embodiment of the present invention.
Figure 1C:
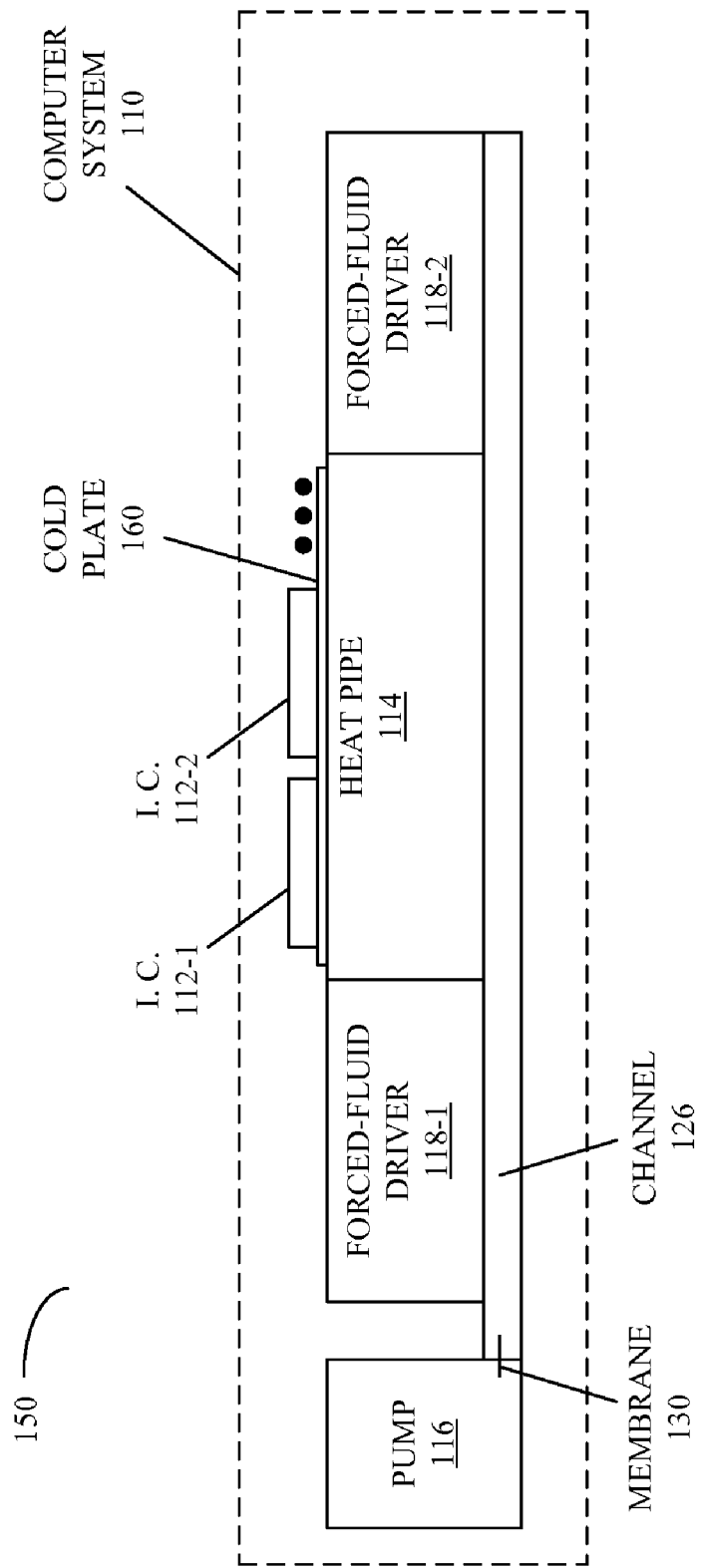
FIG. 1C is a block diagram illustrating a computer system in accordance with an embodiment of the present invention.

We now describe embodiments of the cooling mechanism and the computer system. FIGS. 1A-1C present block diagrams illustrating embodiments 100 (top-view), 130 (side view), and 150 (side view) of a computer system 110 (such as a laptop computer). This computer system may include one or more integrated circuits or I.C.s 112 (e.g., I.C.s 112-1 and 112-2, which can be a processor, a graphics processor, and/or an application-specific integrated circuit) that generate heat during operation. These integrated circuits 112 are thermally coupled to a heat pipe 114. For example, the integrated circuits 112 may be coupled to an external surface of the heat pipe 114 via a thermal interface 140 (such as solder, a phase-change material, and/or thermal grease) or a cold plate 160 (which is described further below with reference to FIG. 2). For example, the phase-change material may include epoxy.

In an exemplary embodiment, the heat pipe 114 has a solid copper jacket with a hollow interior and/or is coupled to a liquid flow channel 126. This interior and/or channel 126 includes a liquid coolant (i.e., a material with little or no sheer strength). For example, the liquid coolant may include: water, a coolant in an R133 group of coolants, and/or a coolant in an R134 group of coolants. In some embodiments, the liquid coolant has a thermal conductivity of 0.6 W/mK (water) or 0.41 W/mK (a water-glycol mixture).

Note that in some embodiments the heat pipe 114 includes two or more metal castings. These castings may include portions of a tube or channel (i.e., the channel 126 may be internal to the heat pipe 114. When the castings are combined, the tube or channel may be formed, thereby providing a path for the liquid coolant. Moreover, in some embodiments these castings may be soldered or welded to each other, thereby hermetically sealing the tube or channel. However, in some embodiments the channel 126 is external to the heat pipe 114 or at least a portion of the channel 126 is external to the heat pipe 114.

Furthermore, a pump 116 coupled to the channel 126 may circulate the liquid coolant, thereby facilitating heat transfer from a power source in the computer system 110 (such as one of the integrated circuits 112) to forced-fluid drivers 118 (such as fans) that are located at opposite ends of the heat pipe 114. These forced-fluid drivers may circulate a fluid (for example, a gas such as air) via fluid-flow ports 120 (i.e., ports 120-1-120-3, which can be vents), i.e., the forced-fluid drivers 118-1 and 118-2 may drive fluid flows 122 (i.e., flows 122-1-122-3). This fluid flow may transfer heat from an interior of the computer system 110 to an external environment. Note that in some embodiments such heat transfer is enhanced by using a heat-coupling mechanism, such as convective-cooling fins. For example, the computer system 110 may include fin stacks 124-1 and 124-2. Furthermore, in some embodiments the fluid flows 122 include a liquid, i.e., alternate forced-fluid drivers 118 are used. And in some embodiments, the forced-fluid drivers 118, the channel 126, and the heat pipe 114 are substantially coplanar.

Note that the heat pipe 114 and/or the channel 126 may be a very efficient, heat-transfer mechanism. In particular, a thermal gradient across the heat pipe 114 and/or the channel 126 may be less than 2 C. Thus, the liquid coolant in the heat pipe 114 and/or the channel 126 may maintain a temperature inside of the computers system 110 and/or on an outer surface of the computer system 110.

In some embodiments, the fluid-flow ports 122 are tapered such that a cross-sectional area decreases as fluid flows from inside of the computer system 110 to outside. For example, the fluid-flow ports 122 may constitute a Venturi tube. Note that this decrease in area may give rise to a Bernoulli effect in which a partial vacuum at the output of the fluid-flow ports 120-1 and 120-2 (and at the input to fluid-flow port 120-3) reduces and/or eliminates recirculation of the fluid flows 122, thereby reducing the temperature inside of the computer system 110.

Furthermore, in some embodiments the pump 116 includes a mechanical pump and/or an electrostatic pump. Alternatively, in some embodiments the pump 116 is configured to circulate the liquid coolant using mechanical vibration (for example, using ultrasonic frequencies) of a membrane 130.

Note that in some embodiments the computer system 110 (as well as the embodiments discussed below) includes fewer or additional components, two or more components are combined into a single component, and/or a position of one or more components may be changed. For example, in some embodiments there may be more or fewer forced fluid drivers 118 and/or a direction of the fluid flows 122 may be reversed. Furthermore, in some embodiments the liquid coolant includes a refrigerant.

Figure 2:
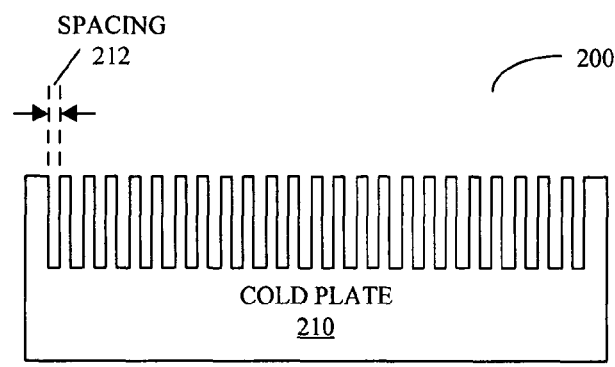
FIG. 2 is a block diagram illustrating a cold plate in accordance with an embodiment of the present invention.

As noted previously, in some embodiments the computer system 110 includes cold plate 160 to improve the thermal coupling between the integrated circuits 112 and the liquid coolant in the channel 126. FIG. 2 presents a block diagram illustrating a side view of an embodiment 200 of a cold plate 210. This cold plate may include channels that extend into the interior of the heat pipe 114 (FIGS. 1A-1C) and/or the channel 126 (FIGS. 1A-1C). These channels may increase a surface area wetted by the liquid coolant, thereby increasing a heat-transfer coefficient of the cold plate by up to an order of magnitude. For example, a given channel may have: a width or spacing 212 between 10-100 µm, a fin pitch between 100-500 µm, a fin thickness between 50-150 µm, a fin height of 1.7 mm, and a base height of 0.3 mm (thus, a total height of 2 mm). In an exemplary embodiment, the cold plate 210 has an area in a top view (not shown) between 100-625 mm². Furthermore, the cold plate may be fabricated from copper having a thermal conductivity of 385 W/mK.

Figure 3A:
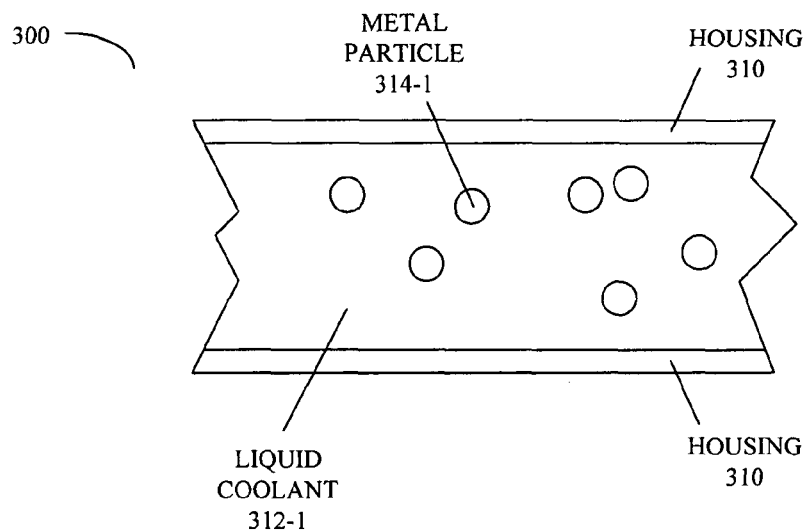
FIG. 3A is a block diagram illustrating a channel in accordance with an embodiment of the present invention.

Note that additional materials and/or phases of matter may be used to increase the heat-transfer coefficient of the heat pipe 114 (FIGS. 1A-1C) and/or the channel 126 (FIGS. 1A-1C). FIG. 3A presents a block diagram illustrating an embodiment of a channel 300. This channel includes a jacket or housing 310, a liquid coolant 312-1, and metal particles 314. In an exemplary embodiment, the metal particles 314 include: copper, aluminum, and/or platinum. Note that in some embodiments the metal particles 314 have a range of cross-sectional areas.

Figure 3B:
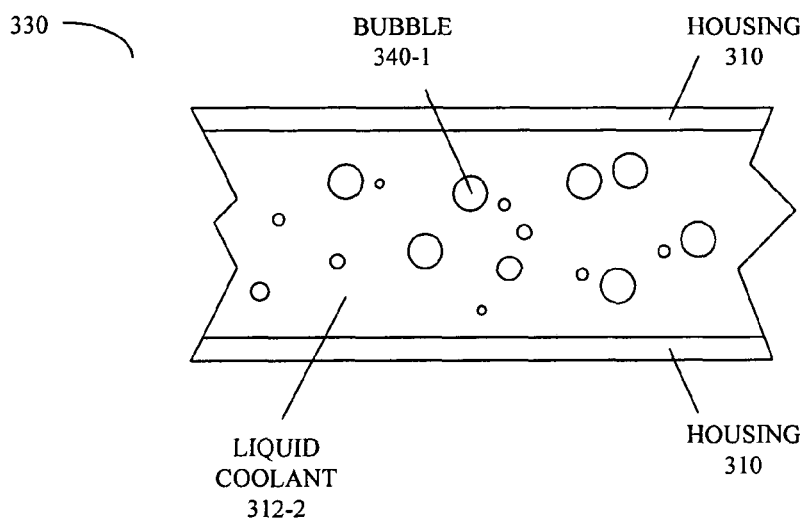
FIG. 3B is a block diagram illustrating a channel in accordance with an embodiment of the present invention.

FIG. 3B presents a block diagram illustrating an embodiment of a channel 330. In this embodiment, the liquid coolant 312-2 includes two phases of matter. In particular, there are bubbles 340, which may have a range of cross-sectional areas. These bubbles may include a gas. Nucleation of the bubbles 340 may increase the heat-transfer coefficient of the liquid coolant 312-2 and/or the channel 330. Note that nucleation of the bubbles or conversion from one phase of matter to another (such as a liquid-to-gas phase transition) may be associated with latent heat. This latent heat may also increase the heat-transfer coefficient of the liquid coolant 312-2 and/or the channel 330.

Figure 4:
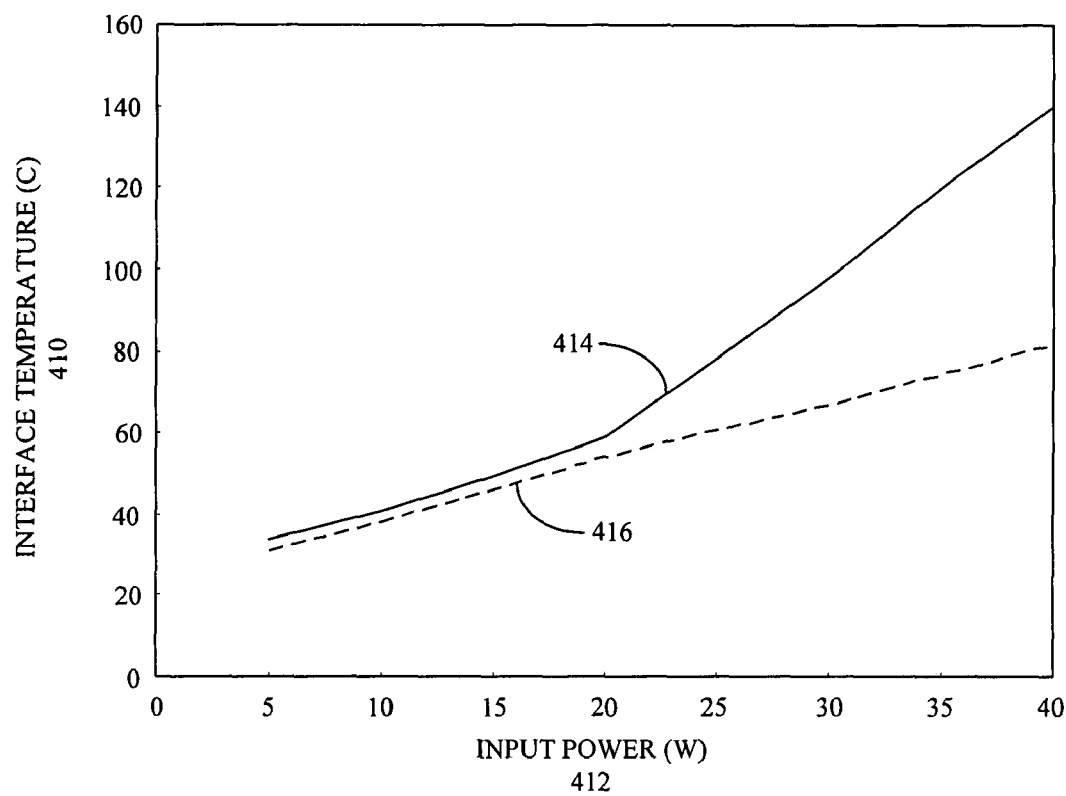
FIG. 4 is a graph illustrating interface temperature versus input power in an embodiment of the present invention.

FIG. 4 is a graph illustrating interface temperature 410 at a CPU versus input power 412 of the CPU for a heat pipe with gas cooling 414 versus liquid cooling 416. With the liquid cooling 416, the interface temperature 410 is less than 80 C until almost 40 W of input power 412, while with gas cooling 414 the interface temperature exceeds 80 C at a little more than 25 W.

Figure 5:
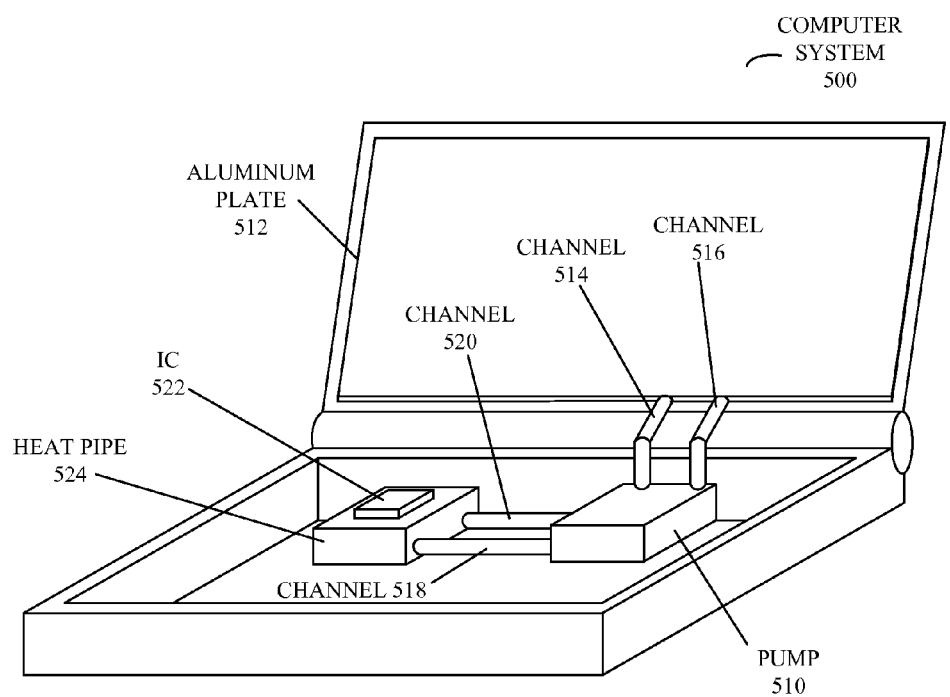
FIG. 5 is a block diagram illustrating a computer system in accordance with an embodiment of the present invention.

In some embodiments, a computer system may thermally couple the liquid coolant to a passive heat sink (as opposed to an active heat-transfer mechanism as illustrated in the computer system 110 in FIGS. 1A-1C). This is shown in FIG. 5, presents a block diagram illustrating an embodiment of a computer system 500. In this computer system, pump 510 circulates the liquid coolant through or in contact with an aluminum plate 512 (e.g., via channels 514-516). As illustrated in the computer system 500, the aluminum plate 512 may be positioned behind a display of a portable computer. In this way, heat transferred by the liquid coolant to the aluminum plate 512 (and thus, the external environment) is less noticeable to a user than when coupled to a bottom surface of the computer system 400 (i.e., the surface that often rests on the user's lap).

Computer system 500 may include one or more integrated circuits or I.C.s 522 that generate heat during operation. These integrated circuits 522 are thermally coupled to a heat pipe 524. In an exemplary embodiment, the heat pipe 524 has a solid copper jacket with a hollow interior and/or is coupled to liquid flow channels 518-520. Channels 518-520 include a liquid coolant (i.e., a material with little or no sheer strength). Furthermore, pump 510 coupled to channels 518-520 may circulate the liquid coolant, thereby facilitating heat transfer from a power source in the computer system 500 (such as one of the integrated circuits 522).

We now discuss embodiments of the process for cooling the computer system. FIG. 6 presents a flow chart illustrating a process 600 for cooling a portable computer system. During this process, the liquid coolant is circulated in a heat pipe, where the liquid coolant has a density greater than the first pre-determined value (610). Then, heat is transferred from the heat pipe to an environment external to the portable computer system using the heat exchanger (612). Note that the heat is associated with an integrated circuit in the portable computer system. Furthermore, in some embodiments there may be additional or fewer operations, the order of the operations may be changed, and two or more operations may be combined into a single operation.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A portable computer system, comprising:
   a power source, wherein the power source includes an integrated circuit;
   a heat pipe having a top surface thermally coupled to the power source and two ends, wherein the heat pipe includes a liquid coolant, and wherein the liquid coolant has a density greater than a first pre-determined value at room temperature;
   a pump coupled to the heat pipe via a liquid-flow-channel, wherein the pump is configured to circulate the liquid coolant in the heat pipe; and
   an aluminum plate positioned behind a display of the portable computer system, wherein the pump is further configured to circulate the liquid coolant through or in contact with the aluminum plate via the liquid-flow channel, thereby transferring heat to an environment external to the portable computer system;
   wherein the liquid coolant completely fills the liquid-flow-channel and includes bubbles of gas.

2. The computer system of claim 1, wherein the integrated circuit includes a processor.

3. The computer system of claim 1, wherein the liquid coolant includes water.

4. The computer system of claim 1, wherein the liquid coolant includes a coolant in an R133 group of coolants.

5. The computer system of claim 1, wherein the liquid coolant includes a coolant in an R134 group of coolants.

6. The computer system of claim 1, wherein the first pre-determined value is greater than 100 kg/m3.

7. The computer system of claim 1, wherein the liquid coolant has a thermal conductivity greater than a second pre-determined value.

8. The computer system of claim 7, wherein the second pre-determined value is greater than 0.1 W/mK at room temperature.

9. The computer system of claim 1, wherein the pump includes a mechanical pump.

10. The computer system of claim 1, wherein the pump includes an electrostatic pump.

11. The computer system of claim 1, wherein the pump is configured to circulate the liquid coolant using mechanical vibration of a membrane.

12. The computer system of claim 1, wherein the computer system includes a laptop computer.

13. The computer system of claim 1, wherein nucleation of the bubbles increases a heat-transfer coefficient of the liquid coolant.

14. The computer system of claim 1, wherein latent heat is used to increase a heat-transfer coefficient of the liquid coolant.

15. The computer system of claim 1, wherein the liquid coolant includes metal particles to increase a heat-transfer coefficient of the liquid coolant.

16. The computer system of claim 1, further comprising a heat exchanger coupled to one of the two ends of the heat pipe, wherein the heat exchanger includes:
   a forced-fluid driver, wherein the forced-fluid driver is configured to pump heat from inside the computer system to the environment; and
   a heat coupling-mechanism coupled to the forced-fluid driver.

17. The computer system of claim 16, wherein the heat coupling-mechanism includes convective-cooling fins.

18. The computer system of claim 1, further comprising a cold plate coupled to the power source and the heat pipe, wherein the cold plate includes channels which increase a surface area wetted by the liquid coolant, thereby increasing a heat-transfer coefficient of the cold plate.

19. The computer system of claim 18, wherein a given channel has a width between 10-100 μm.

20. A method for cooling a portable computer system, comprising:
   circulating a liquid coolant in a heat pipe, wherein the heat pipe has a top surface thermally coupled to an integrated circuit in the portable computer system, and wherein the liquid coolant has a density greater than a first predetermined value; and circulating the liquid coolant from the heat pipe to an aluminum plate positioned behind a display of the portable computer system via a liquid-flow-channel using a pump, thereby transferring heat to an environment external to the portable computer system, wherein the heat is generated by the integrated circuit in the portable computer system;

wherein the liquid coolant completely fills the liquid-flow-channel and includes bubbles of gas.

21. A portable computer system, comprising:

an integrated circuit;

a heat pipe thermally coupled to the integrated circuit, wherein the heat pipe comprises a cavity containing a liquid coolant, and wherein the liquid coolant absorbs heat produced by the integrated circuit through the thermal coupling;

a pump;

an aluminum plate coupled behind a display of the portable computer;

a liquid flow channel configured in a loop between the heat pipe, the pump, and the aluminum plate;

wherein via the liquid flow channel, the pump is configured to circulate the liquid coolant through or in contact with the aluminum plate by:
  drawing the liquid coolant out of the heat pipe;
  driving the liquid coolant through or in contact with the aluminum plate and then back into the heat pipe;

wherein the liquid coolant completely fills the liquid-flow-channel and includes bubbles of gas.

* * * * *